US012687263B2

(12) United States Patent (10) Patent No.: US 12,687,263 B2
Dupont et al. (45) Date of Patent: Jul. 21, 2026

(54) METHOD FOR ACOUSTIC LEAK DETECTION IN A DISTRICT HEAT CONDUCTION NETWORK

(71) Applicant: Kamstrup A/S, Skanderborg (DK)

(72) Inventors: Sune Hoveroust Dupont, Skanderborg (DK); Morten Karstoft Rasmussen, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 310 days.

(21) Appl. No.: 18/557,358

(22) PCT Filed: Mar. 30, 2022

(86) PCT No.: PCT/EP2022/058496
§ 371 (c)(1),
(2) Date: Oct. 26, 2023

(87) PCT Pub. No.: WO2022/228813
PCT Pub. Date: Nov. 3, 2022

(65) Prior Publication Data
US 2024/0209993 A1 Jun. 27, 2024

(30) Foreign Application Priority Data
Apr. 30, 2021 (EP) ..................................... 21171439

(51) Int. Cl.
*G01F 1/66* (2022.01)
*F17D 5/06* (2006.01)
*G01M 3/24* (2006.01)

(52) U.S. Cl.
CPC ............... *F17D 5/06* (2013.01); *G01F 1/666* (2013.01); *G01M 3/243* (2013.01)

(58) Field of Classification Search
CPC ........... G01F 1/666; G01M 3/243; F17D 5/06
USPC ....................................................... 73/40.5 A
See application file for complete search history.

(56) References Cited

U.S. PATENT DOCUMENTS

| | | | |
|---|---|---|---|
| 6,389,881 B1 | 5/2002 | Yang et al. | |
| 2014/0150554 A1 | 6/2014 | Rada et al. | |
| 2015/0330863 A1 * | 11/2015 | Dotan ....................... | F17D 5/06 |
| | | | 702/51 |

FOREIGN PATENT DOCUMENTS

| | | | | |
|---|---|---|---|---|
| CA | 3142807 A1 | 12/2020 | | |
| DE | 202008017243 U1 | 9/2009 | | |
| EP | 3112823 A1 | 1/2017 | | |
| WO | WO-2017005269 A1 * | 1/2017 | ........... | G01N 29/222 |

* cited by examiner

*Primary Examiner* — Peter J Macchiarolo
*Assistant Examiner* — Rodney T Frank
(74) *Attorney, Agent, or Firm* — McGlew and Tuttle, P.C.

(57) ABSTRACT

The method serves the purpose of the acoustic leak detection in a district heating supply network (3), in which a heat transfer medium is circulated between a combined heat and power plant (1) and points of use (5). The points of use (5) have heat meters (10), which operate with ultrasonic flow meters, which operate with ultrasonic flow meters, which can be operated in a leak detection mode for the acoustic leak detection, whereby the acoustic signals detected in the leak detection mode are filtered to eliminate extraneous noises, in particular pump noises.

20 Claims, 1 Drawing Sheet

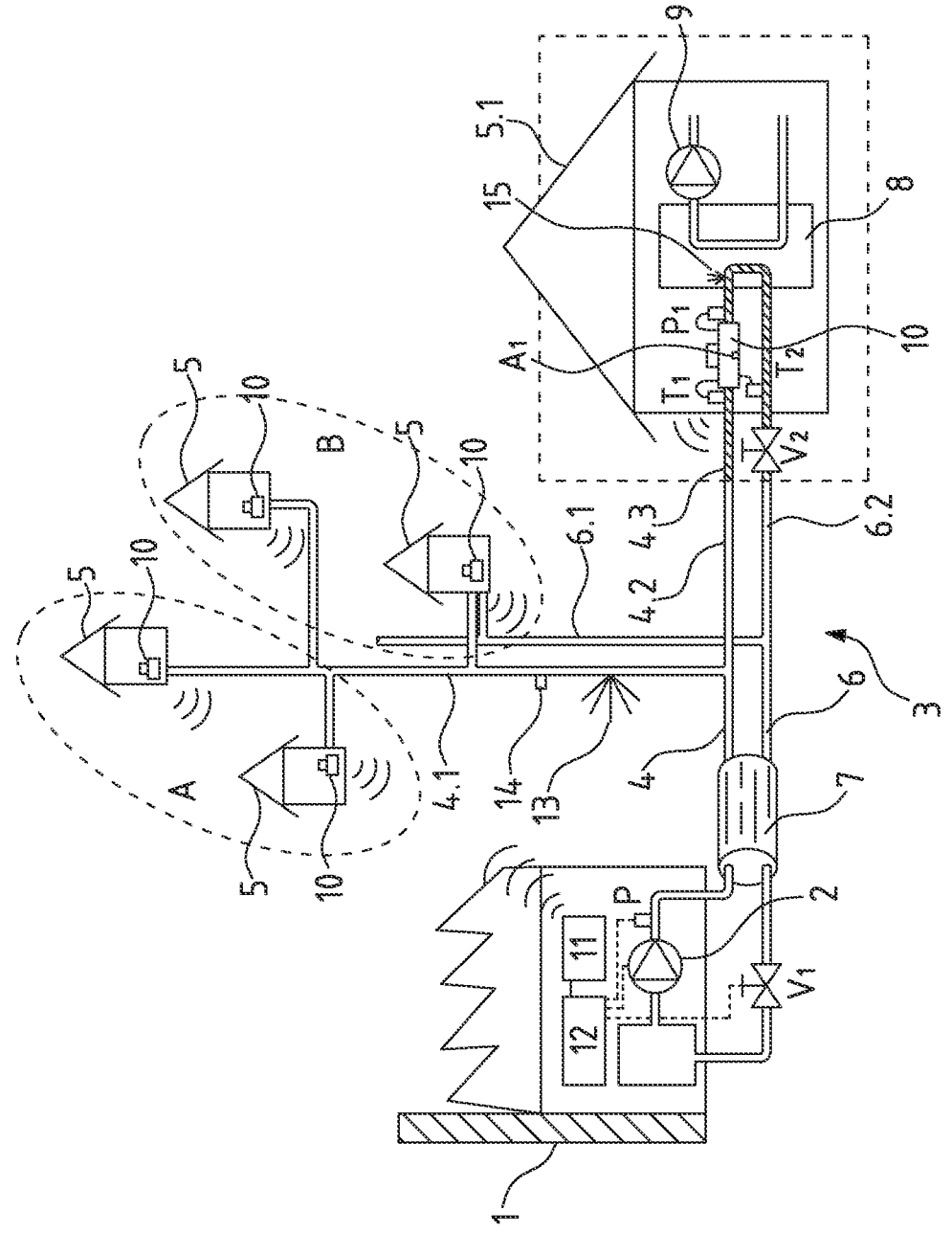

METHOD FOR ACOUSTIC LEAK DETECTION IN A DISTRICT HEAT CONDUCTION NETWORK

CROSS REFERENCE TO RELATED APPLICATIONS

This application is a United States National Phase Application of International Application PCT/EP2022/058496, filed Mar. 30, 2022, and claims the benefit of priority under 35 U.S.C. § 119 of European Application 21171439.9, filed Apr. 30, 2021, the entire contents of which are incorporated herein by reference.

TECHNICAL FIELD

In the case of drinking water supply networks, it is part of the prior art to acoustically locate leakages, namely by using consumption measuring devices, which are installed in the network, e.g. of the type flowIQ 2200 by the Danish company Kamstrup A/S. Domestic water meters of this type detect the flow by means of ultrasound, whereby the ultrasonic receivers are used for the leak identification and leak location using a specific software. These ultrasonic flow meters measure leak noises in a range from 1 to 2 kHz, when the ultrasonic flow meter is not used for the flow measurement, thus when no flow takes place. Such a method can generally also be used in district heating networks, as it is described in EP 3 112 823 A1.

BACKGROUND

The leak detection and location in the district heating supply network has a higher priority than the one in cold water networks because, in the event of a leak, not only water escapes, but also the heat, which is to be transported with the water, whereby the costs are much higher compared to a leak in a drinking or industrial water supply network. In addition, the district heating supply water contains chemical additives, which means contamination of the surrounding area in the case of a leakage.

However, the acoustic leak detection in district heating supply networks has not yet established itself because flow virtually always prevails in a district heating network, which is why the acoustic leak detection, which is common in the case of cold water networks and which takes place when no flow can be determined, cannot be implemented in practice. To make matters worse, the pipes of district heating supply networks are strongly insulated, i.e. are surrounded by an insulating jacket, which strongly dampens the noise, which occurs in the case of a leak.

The thermography, wherein the district heating network is searched above ground by means of manually guided cameras or drones, is thus used predominantly to detect leaks in district heating systems. Such a leak detection, however, is complex on the one hand and is only possible where a sufficiently clear view onto the soil surface above the district heating network is at hand, on the other hand.

Electrical methods are furthermore used for detecting leaks in district heating pipes. The Danish pipe manufacturer Løgstør, for example, installs electrical wires into the insulation of the pipes for this purpose, which wires are electrically connected to one another, before the pipes are sunk into the ground. The leak detection then takes place by means of electrical impedance measurement.

A monitoring software with the name "Heat Intelligence" also belongs to the prior art, which is sold by the Danish company Kamstrup A/S and which operates in connection with the ultrasonic flow meters installed in the district heating supply network. This software uses the temperature measurement of the ultrasonic flow meters and determines a leakage on the basis of a determined temperature jump.

SUMMARY

In light of the foregoing, the invention is based on the object of providing an improved method for the leak detection in a district heating supply network. This object is solved according to the invention by means of a method with the features specified in claim 1. Advantageous designs of the method according to the invention are specified in the subclaims, the following description, and the drawing. A heat meter (also referred to as heat counter or heat quantity meter) for carrying out the method according to the invention is specified in claim 15.

The method according to the invention for the acoustic leak detection in a district heating supply network, in which a heat transfer medium is circulated between a combined heat and power plant and points of use, uses heat meters, which are provided at the point of use and which operate with ultrasonic flow meters, which can be operated in a leak detection mode for the acoustic leak detection. According to the invention, the acoustic signals detected in the leak detection mode are filtered to eliminate extraneous noises, in particular pump noises.

It is the basic idea of the method according to the invention to use the ultrasonic flow meters, which are integrated in heat meters, to detect acoustic signals for the leak detection, and to filter these acoustic signals, which are detected in the leak detection mode, to eliminate extraneous noises, in particular pump noises. Filtering in terms of the invention is to be understood thereby to be the partial or complete elimination of extraneous noises, be it that they are already eliminated from the acoustic signal as such, be it that they are eliminated from the acoustic signal, which is converted into an electrical signal, or be it that the converted electrical signals are digitized and are prepared or further processed in digital form so that it corresponds to the effect of a filtration.

A filtration of extraneous noises, which can interfere with or complicate the leak detection in any way, is generally expedient. However, these are typically the extraneous noises, which are generated by pumps, be it the pumps, which ensure the circulation of the heat transfer medium in the district heating supply network on the combined heat and power plant side or on the network side, but also the pumps, which operate on the consumer side and which ensure the circulation of the heating medium on the consumer side, namely those on the primary side as well as those on the secondary side, i.e. those that are separated from the actual district heating supply network by means of heat exchangers. These pump noises are transferred by means of the medium to be conveyed as well as by means of the available pipeline system, which can consist of plastic and/or metal. In the house of the consumer, interfering noises of pumps, valves, and flow (in adjacent pipes) are transferred through concrete, walls, or installation boxes, e.g. a housing of a district heating transfer station.

The leak detection method according to the invention can thus also be carried out or can in particular be carried out, respectively, when flow prevails in the line system. In contrast to drinking and industrial water supply networks, which only sporadically have flow when water is removed at one or several tapping points, a system-induced flow almost always takes place in the case of district heating supply networks because a heat transport from the combined heat and power plant to the consumer is only ensured during flow. Flow stops are thus present in the district heating supply at all only very sporadically during the warm season even on the consumer side. If one thus wants to become active outside of these special times during the leak detection, then a flow is tolerable during the leak detection according to the invention, but by eliminating the extraneous noises, which are disruptive for the leak detection, in particular if these noises emanate from pumps and can also be identified and thus filtered out with technically reasonable effort.

For the acoustic leak detection it is expedient thereby to control a group of heat meters, so as to not only be able to determine such a leak, but to also be able to locate it, to be able to determine at least one spatial region, where said leak is present. It can be expedient thereby to carry out the leak detection simultaneously in the case of all ultrasonic flow meters, which belong to the group of heat meters determined for this purpose, thus to control all heat meters, which belong to this group, simultaneously to the leak detection, i.e. in a synchronized manner. A simultaneous leak detection with all heat meters belonging to the group is then particularly advantageous when the flow is stopped. Such an interruption of the flow in a district heating supply network or a section of such a network has to only be very brief, times in the millisecond range can be sufficient for the acoustic leak detection. Practical tests thus have resulted in measuring times of 250 ms, which can readily be realized by shutting off valves, briefly shutting off pumps or the like. However, the measurements can also take place in the case of little flow.

According to the invention, however, this is not absolutely necessary because leak detection according to a further development of the method according to the invention by means of ultrasonic flow meters of a group of heat meters can also take place staggered in time, i.e. in an unsynchronized manner, in that the measurement in each ultrasonic flow meter preferably takes place automatically when either a flow stop of a reaching or falling below of a predetermined low flow is detected. The latter is present at least briefly in many regions of the district heating supply network. In particular in the case of low flow, the elimination of extraneous noises is possible in a significantly more effective manner than in the case of high flow. The background noise, which is always present in the network, then also decreases significantly. Due to the fact that the heat meters always have knowledge of the flow amount or a flow stop, respectively, due to the ultrasonic flow meters located therein, they can quasi control themselves for the leak detection as soon as the desired state is reached. The acoustic signal detection then takes place staggered in time, whereby the data representing the measuring process also obtain a time stamp, so as to not only provide for a spatial, but also a temporal assignment of the measurements in one group or optionally also in several groups, respectively. Alternatively or additionally, the flow in the case of the acoustic leak detection method according to the invention can be blocked briefly at least in portions of the heating supply network or on the consumer side. Such a consumer-side blockage preferably takes place in the return line, in order to rule out consumer-side loss of comfort.

It is always the aim of the acoustic leak detection method according to the invention to differentiate the noise caused by the leakage in the supply network from the ambient noises, thus from extraneous noises, in particular pump noises, only then is an effective leak location possible. In order to support this, it is provided according to an advantageous further development of the method according to the invention to apply a pressure, which changes over time, preferably to apply a specified pressure profile, to at least a portion of the district heating supply network during the acoustic leak detection. It is thereby the basic idea that the noise caused by the leak is dependent on pressure in its frequency distribution as well as with regard to the amplitude. The application with a pressure profile thus promotes the differentiability between leak-related noises and extraneous noises or other flow noises, respectively. Acoustic measurements in a time period of the profile with high pressure can in particular be compared with acoustic measurements in a time period of lower pressure. The specified pressure profile advantageously contains such pressure differences. This also simplifies the identification and filtering out of pump noises because the pressure profile brings about a changing pump speed and thus also frequency of the pump noise. This approach has the particular advantage that the district heating remains almost unaffected because the leak detection is performed during the pressure flow, only the pressure profile changes.

While acoustic signals in the frequency range between 1 and 2 kHz are detected during the acoustic leak location of drinking or industrial water supply networks, respectively, in the ultrasonic flow meters in the leak detection mode, it has been shown that a significantly more extensive acoustic frequency spectrum should be detected during the leak detection in a domestic heating supply network. A frequency range between 10 Hz and 10 kHz is advantageously detected in the case of the method according to the invention. It goes without saying that due to this comparatively wider frequency range, the filtering of extraneous noises is particularly important. The focus is thereby essentially on the centrifugal pumps located in the supply network and the extraneous noises emanating therefrom.

The data collected by the heat meters in the leak detection mode of their ultrasonic flow meters is advantageously transmitted in the form of data sets, preferably wirelessly, to a data collection and processing means (head-end system). In the case of heat meters, the communication with such data collection and processing means belongs to the prior art. In a simple form, the transmission of data packets in one direction can by sufficient thereby, but a bidirectional communication takes place in an advantageous manner, so that, for example, the switch-over into the leak detection mode can also take place centrally via the data collection and processing means.

Data collection and processing means in terms of the present invention does not have to be a device located at one location, it is conceivable that several spatially distributed data collection and communication means are provided, which communicate with groups of heat meters and the data of which is further processed, e.g. in a data center or one or several computers. When such data sets of groups of heat meters are to be evaluated, which comprise hundreds or thousands of heat meters, significant computing power is required. The evaluation thus typically also does not take place in real time but when all of the data sets are collected. In particular in the case of battery-powered heat meters, the data communication always means an additional energy consumption, which is to be avoided. Data is thus transmitted only at certain times, whereby channel and signal strength are selected so that the lowest possible transmitting powers are required. The evaluation of these data sets therefore has to take place temporally independently of the data collection.

With regard to the extraneous noises generated by pumps in the combined heat and power plant within the district heating supply network, it is particularly important to eliminate them because all detected acoustic signals would overlap otherwise and would complicate the leak detection. According to a further development of the invention, it is thus provided to systematically control at least one of these pumps, but preferably the pumps, which are relevant in this region, for detecting the acoustic signals generated during the operation thereof, preferably in the leak detection mode of the ultrasonic flow meter, so as to be able to systematically assign and filter out the signal, which is then detected on the ultrasonic flow meter side. If thus such a pump is thus systematically controlled in the leak detection mode of one or several heat meters, said pump can be identified and filtered out signal-wise.

The control thereby takes place either by means of the data collection and processing means, but preferably also by means of an operator on location by means of an external control device, which preferably communicates wirelessly with at least one pump and with at least one ultrasonic flow meter of a heat meter. Such a control device can be formed by a smart phone comprising an app installed thereon accordingly, which communicates with the pump or the pumps and the ultrasonic flow meter or ultrasonic flow meters either via the Internet or the data collection and processing means or which optionally also communicates directly with the heat meters, so as to be able to generate and assign the signals detected by the ultrasonic flow meters accordingly.

The elimination of extraneous noises by means of filtering requires that these noises are identified as extraneous noises, are assigned, and are then optionally eliminated. In a further development, the method according to the invention thus requires in this respect that acoustic patterns are determined and stored systematically prior to determining extraneous noises, so that, when detecting extraneous noises, which correspond to these acoustic patterns, said extraneous noises can be identified and can optionally be eliminated. The method according to the invention thereby advantageously differentiates between extraneous noises, which come from the district heating supply network, and those, which come from the consumer, thus from the point of use. Due to the fact that the extraneous noises, which come from the point of use are often generated significantly closer to the heat meter than those coming from the network, it is expedient for the leak detection in the supply network to filter out these extraneous noises coming from the direction of the point of use. In a further development of the invention, the method according to the invention thus provides for detecting the direction of the noises and for then optionally eliminating the signals coming from the direction of the point of use. The direction determination of an acoustic signal can be made in a heat meter, which is based on ultrasonic measurement, in that the amplitude, a speed, or a phase angle of the signal is measured at two points and the direction is determined from a difference between the two values.

As explained above, it is expedient to use a largest possible number of heat meters for the leak detection, in particular for the leak location, so as to find a leak by comparing the data sets transmitted by said heat meters, and to optionally also limit them spatially. It is advantageous in this respect when the data collecting and processing means wirelessly connects a number of heat meters into the leak detection mode for the leak detection and switches them back into the normal measuring mode after transmission of the data. The switch-back can advantageously also take place automatically when the corresponding data is collected and stored from the leak detection mode in the heat meter.

So as not to only carry out a leak detection but also a leak location by means of the method according to the invention, it is expedient to either equip the leak location data transmitted by the heat meters with GPS data or to store said leak location data in the data collection and processing means in such a way that a spatial determination of the leakage point can take place according to the GPS data of the transmitted data sets or the GPS data of the heat meters, which generate these data sets, respectively.

The method according to the invention is preferably carried out by means of several groups of heat meters, whereby one group preferably comprises between 10 and 1000 spatially contiguous heat meters. It will generally not be expedient to use several heat meters with virtually identical GPS data, as they are present, for example, when being used in apartment buildings, for the leak location. This is generally only expedient for leak location within the house, which can obviously be carried out analogously by means of the method according to the invention. For the leak location in the district heating supply network, in contrast, it is expedient to use only the heat meters for the leak location, which differ sufficiently with regard to their GPS data.

It is furthermore expedient to determine a background noise for such a group of heat meters, which are used for the acoustic leak location in the leak detection mode of their ultrasonic flow meters, and to filter out said background noise in the same way in the case of all heat meters, in order to free the group of heat meters from this background noise.

To carry out the method according to the invention, a heat meter will need to be adapted accordingly, at least with regard to software, it is thereby advantageous in particular for a bidirectional communication with the data collection and processing means, when the heat meter has a transmitting and receiving unit for the wireless bidirectional communication. Bidirectional communication in terms of the present invention does not refer to the communication, which confirms the completeness of the transmitted data packets during the transmission of data sets, but to such a communication, which comprises data transmission in both directions, thus in particular also data, by means of which the heat meters can be controlled for the leak detection.

According to a further development of the invention, it can be expedient to equip the heat meter with a control connection for a shut-off valve or to integrate such a shut-off valve, so as to be able to at least briefly stop the consumer-side flow in order to improve the acoustic signal collection.

Noise loggers, which are attached on the main line side and which transmit acoustic signals to the control center, in order to use these acoustic signals together with acoustic signals from the heat meters to eliminate extraneous noises, are advantageously used in the case of the method according to the invention.

The acoustic leak detection is further advantageously carried out during a flow in a line, in particular a main line or feed line.

In addition to an ultrasonic flow meter, heat meters, as they are used to carry out the method according to the invention, typically have two temperature sensors for the feed and the return line. According to a further development of the invention, it is particularly advantageous to internally or externally also provide such a heat meter with an acceleration sensor, via which additional data, which can also be advantageous for the signal determination when filtering out the extraneous noises, can be collected during the leak location.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a diagram of method for the acoustic leak detection in a district heating supply network.

DESCRIPTION OF PREFERRED EMBODIMENTS

It is described in an exemplary manner on the basis of the FIGURE, how a leak detection can be designed in practice:

The basic setup of a district heating supply network is illustrated on the basis of the highly simplified drawing. A heat transfer medium, typically water, is heated in a combined heat and power plant 1 and is fed by means of a pump 2 into a district heating supply network 3, which has a central feed line 4, which ends in feed lines 4.1 and 4.2, via which points of use 5 are supplied with heat. Corresponding return lines 6.1 and 6.2 lead from the points of use 5 into a central return line 6 back to the combined heat and power plant 1, where the cycle closes. All lines 4, 6 have an insulating cladding 7. The points of use 5 are either integrated directly into the supply network 3 as it used to be common, or are integrated via heat exchangers 8, as it is common today. In the case of a direct integration, circulation pumps, which are not illustrated in detail in the FIGURE, can also be provided within the points of use 5. When using a heat exchanger 8, at least one circulation pump 9 is provided on the secondary side, thus on the side of the point of use 5, which circulation pump distributes the heat within the house to where it is needed.

All points of use 5 have in common that they have a heat meter 10, as it is illustrated schematically on the bottom right in the drawing in the case of the point of use 5.1. On the one hand, such a heat meter 10 detects the flow, i.e. the amount of the heat transfer medium, which flows through the point of use 5 via the feed line 4.2 and the return line 6.2. They further have a first temperature sensor T1, which detects the temperature in the feed line 4.2 when entering into the point of use 5.1, as well as a second temperature sensor T2, which detects the temperature of the heat transfer medium in the return line 6.2 when exiting from the point of use 5. The heat meter 10 furthermore comprises a pressure sensor P1 as well as an acceleration sensor A1, which detects movements/vibrations of the line within the heat meter 10.

In the heat meter 10, the flow quantity is detected by means of an ultrasonic flow meter, which detects the speed of the heat transfer medium, which flows through, with the help of acoustic waves and which has at least one ultrasonic transmitter and an ultrasonic receiver, which are arranged so that the ultrasonic signal permeates the liquid, which flows through. Two transmitters and two receivers are typically provided. Heat meters 10, which operate with ultrasonic flow meters, belong to the prior art and will thus not be described in detail here, reference is made here only in an exemplary manner to the heat meters by the Danish company Kamstrup A/S, which are offered under the model name Multical and which operate according to this principle and which determine, store and wirelessly transmit the amount of heat consumed by the point of use 5.1 on the basis of the flow and the temperature difference of the temperature sensors T1 and T2 to the so-called head-end system 11, thus a data collection and processing means 11.

In contrast to the prior art, the heat meter 10 has an acceleration sensor A1, which detects vibrations/movements introduced via the pipeline, furthermore a control connection for a shut-off valve V2 arranged in the return line 6.2, and a control and communication electronics, which makes it possible to switch the heat meter 10 into a leak detection mode, to thereby receive acoustic data via the ultrasonic receiver located in the ultrasonic flow meter, to filter said data, to provide it with a time stamp, and to wirelessly transmit it to the head-end system 11 at the appropriate time.

In order to filter interfering acoustic signals away from the point of use 5.1, the heat meter 10 determines the direction of a signal by means of the two installed ultrasonic sensors (not shown in the FIGURE). Such sensors sit spaced apart from one another, e.g. 10 cm. An arriving signal hits the one sensor before the other one, and the direction can be determined from this difference in time. The signal can then optionally be filtered away, for example the one from the leak point 15 in the heat exchanger 8.

The heat meters 10 communicate wirelessly with the head-end system 11, which, in turn, is data-connected to a control center 12, which is likewise provided on the combined heat and power plant side here.

A leak point 13 in the feed line 4.1 is illustrated in an exemplary manner in the FIGURE. Two groups A and B of heat meters 10, which are arranged at different sections of the district heating supply network 3, are provided here in an exemplary manner for the leak detection. These heat meters 10 can be switched wirelessly into the leak detection mode via the head-end system 11 from the control center 12. This can either take place simultaneously or controlled by the ultrasonic flow meters in the heat meters 10, when a specified low flow is reached or when the flow comes to a stop, e.g. by controlling the shut-off valve V2 in the return line 6.2 of the heat meter 10 of the point of use 5.1. This state can generally also be reached via a valve V1 from the control central 12 for the return line 6, which, however, is not possible during normal heating operation. The leak detection will then generally take place when a smallest possible flow is reached and a filtering of extraneous noises takes place, which are typically caused by the pumps 2 and 9, which are illustrated in an exemplary manner here.

Due to the fact that the control of the pump 2 takes place via the control center 12 of the combined heat and power plant 1, said pump can readily be integrated into the leak detection by means of the heat meters 10 in such a way that a temporally changing pressure profile is applied into the district heating supply network 3 via this pump 2, which pressure profile is detected via the pressure sensors P1 of the heat meters 10 of the points of use 5. Due to this pressure profile, an assignment of the pump noises generated by the pump 2 in the supply network 3 is possible, the pump noises can be identified, which are stored as pattern and which are identified and filtered out during the later measuring process when they occur. By filtering out these extraneous noises, it is possible to also carry out the leak detection during ongoing operation.

The groups A and B, which are illustrated symbolically here, which are arranged at spatially different locations of the district heating supply network 3, symbolize groups of hundreds to thousands of heat meters 10. As can be seen in the graphic illustration, the group B is closer to the leak point 13 than the group A, measured on the pipe length, so that a certain regional tendency, in the ideal case a virtually exact spatial location of the leak point 13 is possible when comparing the data within the groups A and B as well as by comparing the data of the groups A and B.

Due to the length of the pipe of the district heating supply system, so-called "blind spots" occur, i.e. pipe sections where a leak is not "heard". It may be the case in the FIGURE that the heat meter 10 in the point of use 5.1 hears the leakage at the leak point 13. However, this leak is in the feed line 4.1. This is a large pipe, larger than the house line 4.3, which often consists of a different material, e.g. plastic, and also lies relatively far away from the point of use 5.1. The measured signal will be weak if it can be detected at all. In order to make such a "blind spot" audible, a so-called noise logger 14 can be attached to the pipe 4.1. The noise logger 14 is a battery operated microphone and includes wireless communication electronics. It measures acoustic signals in the main line. Several noise loggers can be attached over the length of the line 4.1 and 4.2, and they can communicate either directly with the heat meters 10 or the control center 12. With their measurement in a combination method with the heat meters, the noise loggers contribute to the determination of extraneous noises and leak noises.

While specific embodiments of the invention have been shown and described in detail to illustrate the application of the principles of the invention, it will be understood that the invention may be embodied otherwise without departing from such principles.

LIST OF REFERENCE CHARACTERS 1 combined heat and power plant
2 pump
3 district heating supply network
4 feed line
4.1, 4.2 feed lines
4.3 house line
5 point of use
5.1 point of use
6 return line
6.1, 6.2 return line
7 insulating cladding
8 heat exchanger
9 circulation pump
10 heat meter
11 head-end system/data collection and processing means
12 control center
13 leak point
14 noise logger
leak point in the heat exchanger
T1 temperature sensor
T2 temperature sensor
P1 pressure sensor
A1 acceleration sensor
V1 central shut-off valve at the combined heat and power plant 1
V2 shut-off valve in the return of the point of use 5.1

The invention claimed is:

1. A method for the acoustic leak detection in a district heating supply network, the method comprising the steps of:
   circulating a heat transfer medium between a combined heat and power plant and points of use;
   providing the points of use with heat meters, which operate with ultrasonic flow meters, which can be operated in a leak detection mode for acoustic leak detection; and filtering the acoustic signals detected in the leak detection mode to eliminate extraneous noises, wherein at least one pump for detecting the acoustic signals created during the operation thereof is controlled in the leak detection of the ultrasonic flow meter, whereby the signal detected on an ultrasonic flow meter side is used to filter out pump noise.

2. The method according to claim 1, wherein at least one group of heat meters is controlled for the leak detection, whereby the leak detection in the case of all ultrasonic flow meters of the heat meters belonging to the group takes place simultaneously when flow is stopped.

3. The method according to claim 1, wherein the leak detection takes place by means of ultrasonic flow meters of a group of heat meters, whereby a measurement in each ultrasonic flow meter takes place automatically when the groups of heat meter has detected a flow stoppage or a reaching or falling below of a predetermined low flow.

4. The method according to claim 1, wherein flow is blocked at least in portions of the district heating supply network or on the consumer side, for the purpose of the leak detection.

5. The method according to claim 1, wherein a pressure, which changes over time, is applied to at least a portion of the district heating supply network during the acoustic leak detection.

6. The method according to claim 1, wherein the ultrasonic flow meters detect acoustic signals in the frequency range between 10 Hz and 10 kHz in the leak detection mode.

7. The method according to claim 1, wherein data collected by the heat meters in the leak detection mode of associated ultrasonic flow meters is wirelessly connected to a data collection and processing means.

8. The method according to claim 1, wherein a data communication between the at least one pump, at least one of the ultrasonic flow meters, and an external wirelessly connected control device, takes place for the pump noise determination.

9. The method according to claim 1, wherein extraneous noises are identified on the basis of previously determined acoustic patterns and/or are determined and eliminated with regard to a noise direction thereof, whereby only the extraneous noises, which come from a direction of a point of use, are eliminated.

10. The method according to claim 1, wherein a data collection and processing means wirelessly connects a number of heat meters into the leak detection mode for the leak detection and switches the heat meters back into a normal measuring mode after transmission of data or the heat meters are automatically returned back into said normal measuring mode.

11. The method according to claim 1, wherein leak location data transmitted by the heat meters is evaluated in a data collection and processing means based on a spatial arrangement of the corresponding heat meters for spatially determining the leakage point.

12. The method according to claim 1, wherein the leak detection takes place by means of several groups of heat meters, whereby one group comprises between 10 to 1000 spatially contiguous heat meters.

13. The method according to claim 1, wherein a background noise is determined and filtered out for a group of heat meters during the acoustic signal detection for the leak detection.

14. The method according to claim 1, wherein noise loggers, which are attached on a main line side, transmit acoustic signals to a control center, in order to use associated acoustic signals together with acoustic signals from the heat meters to eliminate extraneous noises.

15. The method according to claim 1, wherein the acoustic leak detection is carried out during a flow in a line, comprising at least one of a main line and a feed line.

16. A heat meter for carrying out the method according to claim 1, wherein a transmission and receiving unit is provided for wireless bidirectional communication with a data collection and processing means.

17. The heat meter according to claim 16, wherein a control connection is provided for a shut-off valve or which has a shut-off valve, and/or which is provided with an acceleration sensor.

18. The method according to claim 5, wherein the pressure has a specified pressure profile.

19. The method according to claim 11, wherein the spatial arrangement of the corresponding heat meters is based on GPS data for spatially determining the leakage point.

20. A method for the acoustic leak detection in a district heating supply network, the method comprising the steps of: circulating a heat transfer medium between a combined heat and power plant and points of use; providing the points of use with heat meters, which operate with ultrasonic flow meters, which can be operated in a leak detection mode for acoustic leak detection; providing at least one pump; controlling the at least one pump to detect acoustic signals created during a pump operation of the at least one pump in the leak detection mode, filtering out pump noise in the leak detection mode using a signal detected on an ultrasonic flow meter side.

* * * * *